March 18, 1952 W. A. DOWNEY 2,589,482
POSITIVE LOCKPIN
Filed May 13, 1949 2 SHEETS—SHEET 1
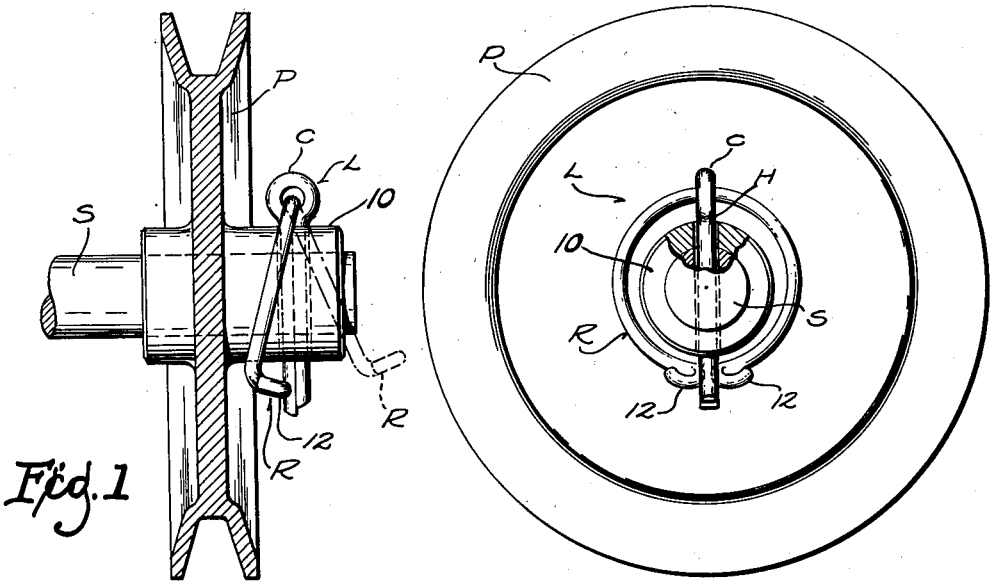
Fig. 1
Fig. 2
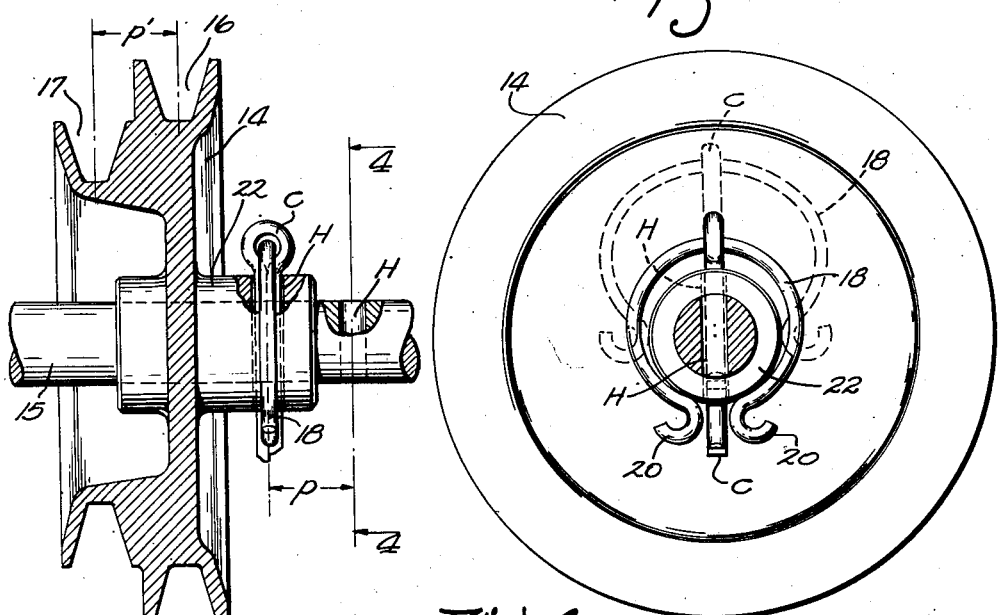
Fig. 3
Fig. 4
INVENTOR.
WAYNE A. DOWNEY.
BY:
*Ad R Johnson*
AGENT.

March 18, 1952 — W. A. DOWNEY — 2,589,482
POSITIVE LOCKPIN
Filed May 13, 1949 — 2 SHEETS—SHEET 2

INVENTOR.
WAYNE A. DOWNEY.
BY:
AGENT.

UNITED STATES PATENT OFFICE 2,589,482

POSITIVE LOCKPIN

Wayne A. Downey, Moline, Ill., assignor to J. I. Case Company, Racine, Wis., a corporation of Wisconsin Application May 13, 1949, Serial No. 93,065

7 Claims. (Cl. 287—52.08)

This invention relates to a positive lock pin for securing pulleys, sprockets or the like to a shaft.

An object of this invention is to provide a positive lock pin that can be quickly inserted or removed without the aid of tools.

Another object is to provide a lock pin that will not be dislodged by centrifugal force.

Another object is to provide a lock pin device that utilizes as one member thereof a commercially available cotter pin, thus permitting this device to be secured at a reasonable price.

Another object is to provide a lock pin having a standard part which can be discarded when damaged or worn by merely removing the pin proper from its associated part and assembling with a new pin.

Another object is to provide a lock pin which can be used repeatedly and which is not easily damaged.

Another object is to provide a lock pin that requires merely the provision of mutually aligned holes in the members to be keyed or secured together.

Still another object is to provide a lock pin that will be in double shear, thus allowing the use of a relatively small pin which obviously requires only a small hole in the members to be secured together.

Another object is to provide a lock pin which need not be bent to keep it in place. Such bending makes removal difficult and necessitates the frequent replacement of the cotters.

Further objects and advantages of the invention will become apparent from the consideration of the following detailed description taken in connection with the accompanying drawings wherein a satisfactory embodiment of the invention is shown. However, it is to be understood that the invention is not limited to the details disclosed but includes all such variations and modifications as fall within the spirit of the invention.

This invention is intended to satisfy the need for a means of keying or securng pulleys, sleeves or other like members to a shaft. There are numerous machines in which the various drives thereon are driven by belts and pulleys or sprockets and chains. Such drives may require frequent substitution of larger or smaller drive members in order to provide speed changes. It is common practice to use pulleys or sprockets having two driving steps on one unit. These pulleys or sprockets are often located intermediate the ends of the shafts and are usually not removed but are axially adjusted. When using these multiple-step pulleys or sprockets it is often the practice to provide a set screw in the hub thereof, and after being properly located the set screw is turned snugly against the shaft. This practice is objectionable in that the shaft is often damaged by the set screw and the proper position of the pulley or sprocket on the shaft is not easily determined. An additional objection to set screws is that they do not provide a positive drive.

This invention avoids the above mentioned objections and is advantageous for other reasons which will be understood from the following description.

Referring to the drawings,

Fig. 1 shows a lock pin holding a pulley on the end of a shaft;

Fig. 2 is an end view of the arrangement of Fig. 1;

Fig. 3 is a view showing a 2-speed pulley intermediate the ends of a shaft, the latter having a plurality of holes therein to allow the pulley to be located in several positions in order to align the pulley steps and showing a modified form of the lock pin;

Fig. 4 is an end view of the arrangement shown in Fig. 3;

The preferred form of this invention as shown in Figs. 1, 2, 5 to 7 comprises a shaft S upon which the pulley P or other member such as a sprocket or sleeve is to be secured. The pulley P and the shaft S have axially registering or alignable holes therethrough at a convenient position to accomodate the lock pin device L. The lock pin L comprises a standard cotter C selected to fit the holes H and having a ring R linked through the eye thereof. The device of the preferred form is applied by inserting the cotter C into hole H. The ring R is rotated as shown in Fig. 1 until the ends thereof snap over the cotter C, thus locking the latter against displacement from the holes H.

Referring to Figs. 1 and 2, S is a shaft adapted to carry power transmission members such as a pulley P in this instance. Pulley P is located at the end of shaft S and can be conveniently removed and replaced at will. Shaft S and pulley P have mutually alignable holes H drilled therein, which operation can be part of standard production of the parts and do not need fitting in assembly. The holes H can be large enough to compensate for slight errors in alignment so that the pin C can be inserted freely. The standard pulleys or sprockets available are usually provided with a suitable hub 10 of a length to accommodate the lock pin L.

In this instance the lock pin device L makes use of a standard commercially available split cotter pin C. The use of standard parts is advisable for reasons of economy. Cotter C is selected so as to fit holes H freely without excessive clearance and should be of a length sufficient to extend beyond the hub of the pulley 10 for reasons to be later described.

Figure 5:
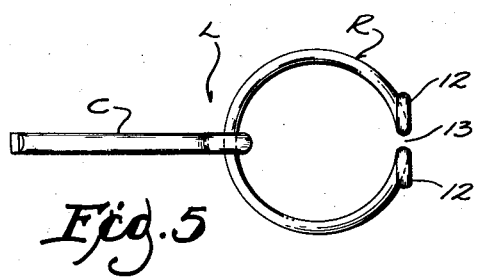
Figs. 5, 6 and 7 show a type of lock pin employed in Figs. 1 and 2.
Figure 7:
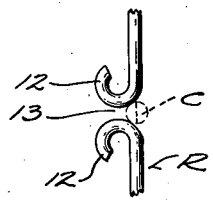
Figure 6:
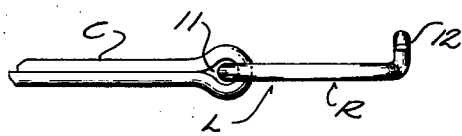

Referring to Figs. 1, 2, 5, 6 and 7, a ring shaped member R of spring steel or other suitable material is freely linked through the eye 11 of cotter C. Ring member R may be of any desired contour, preferably annular, and of a diameter to conveniently embrace the hub 10, without swinging clear of the protruding end of cotter C. The cross-section of the wire from which ring member R is made is preferably of circular form. Figs. 5 and 7 show the specific details of ring member R. The ends of the ring R terminate in this instance in loops 12.

Loops 12 are sufficiently open so that the cotter pin can be easily assembled thereon. Space 13 between loops 12—12 is smaller than the diameter of cotter C which is indicated by dotted lines in Fig. 7. Loops 12 in this instance lie in a plane which is at right angles to the plane of ring member R. The reason for this construction will be made clear below.

Figure 8:
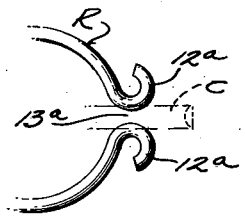
Fig. 8 is a modification having the end loops lying in the plane of the ring.

Figs. 1 and 2 show the application of the lock pin L to the mounting of a pulley P to the end of a shaft S. The pulley P is placed on the shaft S and adjusted until the holes H in both members register. The cotter C is inserted in the holes H until stopped by the eye 11 with the axis of the latter at right angles to the axis of the shaft S. The ring member R should be swung to the position indicated by dotted lines in Fig. 1. To lock the cotter securely in place against accidentally being displaced, it is only necessary to place the thumb against the two loops 12 and push them to the position taken in Fig. 1. Owing to the fact that space 13 is less than the diameter of the cotter C there will be no tendency for the ring member R to accidentally assume the dotted position and allow the cotter C to become dislodged from the holes H. The reason for making the plane of loops 12 at an angle to that of ring member R is to enable the loops 12 to more readily pass over the cotter C. Fig. 8 shows a modification in which the loops are made in the same plane as that of ring R. This form may prove to be more economical to produce. In this modification space 13a is less than the diameter of cotter pin C. Loops 12a may be of the same diameter as loops 12. Aside from the modification in design the function is the same as that in Figs. 1, 2, 5 and 7 inclusive. To remove the lock pin the ring member R is merely moved in the reverse direction to that when applying.

Figure 9:
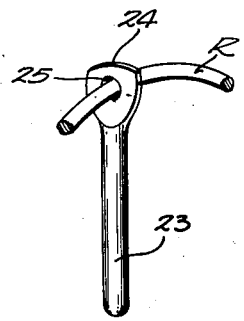
Fig. 9 is a modification utilizing the solid pin provided with a flat end and a pierced hole.
Figure 10:
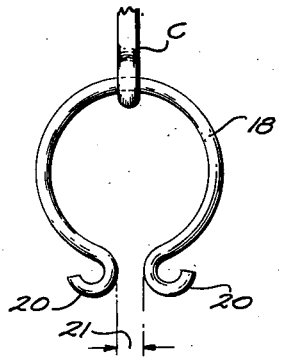
Fig. 10 shows the type of lock pin employed in Figs. 3 and 4.

It is frequently desired to secure a multiple-step pulley 14 to a shaft 15 intermediate the end thereof as shown in Figs. 3 and 4. When this is done it may also be necessary to provide means for shifting the pulley a definite amount so that the respective step 16 or 17 may be connected by belt to another pulley, and holding the pulley in that position. The selected position should be accurately located to avoid unnecessary wear on the belt. Holes H—H have a center distance $p$ equal to the center distance $p'$ between steps 16 and 17 of pulley 14. It is believed that this modification provides a convenient and positive lock pin device for the purpose. Referring to Figs. 3, 4 and 9 C is the cotter having a ring member 18 linked through the eye 11 thereof. Ring member 18 is similar to ring member R above with some necessary changes. The ends of ring member 18 terminate in loops 20 leaving a space 21. Loops 20 lie in the plane of ring member 18. As shown in Figs. 3, 4 and 10, ring member 18 should encircle the hub 22 an amount such that the diameter of the hub 22, in order that when the lock pin has been assembled in the hub it will not be ejected by centrifugal force if the shaft 15 is rotated at high speed.

When the modified lock pin is to be assembled, the hole H in pulley 14 and one in shaft 15 are made to register. The cotter C is inserted in the registered holes H while ring member 18 is guided so that loops 20—20 pass over hub 22 and assume the position shown in Fig. 4. When applying the device of the modification the ring member 18 is not rotated in eye 11 of cotter C but is guided in a plane normal to the axis of shaft 15. If pulley 14 has more than two steps, additional holes H can be drilled in shaft 15 as indicated in Fig. 3.

When it is desired to shift the pulley axially it is only necessary to press upwardly with the thumbs against loops 20—20 until they pass the greatest dimension of hub 22. Cotter C can then be removed from the hole.

A cotter as shown in Fig. 9 may be preferable to the standard type. The cotter 23 is made of wire of the proper size and length. One end 24 is flattened and a hole 25 is punched or drilled to freely accommodate the ring member.

The above being a complete description of an illustrative embodiment of the invention, what is claimed as new and desired to be secured by Letters Patent of the United States is:

1. A means adapted to secure a hub to a shaft each being provided with mutually aligned diametrical holes, comprising a split cotter pin adapted to fit said holes and having an eye at one end thereof, the other end of said pin protruding from said hub, an interrupted annular member pivoted freely in said eye and being of a diameter in excess of that of the said hub, the ends of said annular member terminating in loops lying in a plane angularly disposed to the plane of said annular member, said loops separated an amount less than the breadth of said cotter pin so as to resist free passage of said protruding portion therebetween when said annular member is pivoted about said eye and thereafter passes through a plane normal to the axis of said shaft.

2. A means adapted to secure a hub to a shaft, each being provided with mutually aligned holes passing through said hub and shaft normally to the axes thereof, comprising a cotter pin provided with an eye at one end thereof and adapted to fit said holes, the other end of said pin protruding from said hub, an interrupted annular member pivoted freely in said eye and being of a diameter in excess of that of the said hub, the ends of said annular member terminating in loops separated an amount less than the breadth of said pin so as to resist free passage thereof between said loops when said annular member is pivoted about said eye, and thereafter passes through a plane common to the axis of said pin.

3. A means adapted to secure a hub to a shaft each provided with mutually aligned diametrical holes, comprising a cotter pin having an eye at one end thereof, adapted to fit said holes, the other end of said pin protruding from said hub, an interrupted annular member pivoted freely in said eye and being of a diameter in excess of that of the said hub, the ends of said annular member being separated an amount less than the breadth of said cotter pin so as to resist free passage of said protruding portion of said pin there-between when said annular member is pivoted about said eye and passed thereafter through a plane normal to the axis of said shaft.

4. A means for securing a sleeve and a shaft together in driving relation each being provided with mutually registering holes, comprising a cotter pin provided with an eye and inserted in said holes, said cotter pin being of a length in excess of the diameter of said sleeve so as to protrude therefrom, an interrupted ring-like member pivoted in said eye and adapted to freely surround said sleeve, the ends of said ring-like member being separated an amount less than the breadth of said cotter pin to resist the free passage of said pin therebetween, when said ring-like member is rotated about said eye.

5. A means for securing a hub and shaft together in driving relation each being provided with mutually aligned holes, comprising a pin provided with an eyelet at one end, inserted in said holes and having a protruding other end, a discontinuous annulate member rotatably associated with said eye and freely surrounding said hub, the ends of said annulate member separated an amount less than the breadth of said pin so as to resist free passage of said pin therebetween when said annulate member is rotated in said eye through a plane containing the axis of said holes.

6. A means for securing a hub and a shaft together in driving relation, each being provided with mutually aligned holes, comprising a cotter pin provided with an eye and inserted in said holes, a discontinuous ring-like member pivotally inserted in said eye and of a diameter in excess of that of said hub, the ends of said ring-like member being separated an amount less than the diameter of said hub said ring being rotatable in said eye so as to circumscribe said hub and retain said pin in said holes.

7. A means for securing a hub and a shaft together in driving relation each being provided with mutually aligned apertures, comprising a lock member adapted to be inserted in said apertures and mutually securing said hub and said shaft against relative rotation, said lock member being provided with an eyelet, a discontinuous ring-like member pivotally inserted in said eyelet and being of a diameter in excess of said hub, the ends of said ring-like member directed away from the center thereof and separated an amount less than the diameter of said hub and rotatable in said eye so as to circumscribe said hub.

WAYNE A. DOWNEY.

REFERENCES CITED

The following references are of record in the file of this patent:

UNITED STATES PATENTS

| Number | Name | Date |
|---|---|---|
| 1,296,042 | Bralove | Mar. 4, 1919 |
| 1,918,148 | Strickland | July 11, 1933 |